Patented Apr. 13, 1943

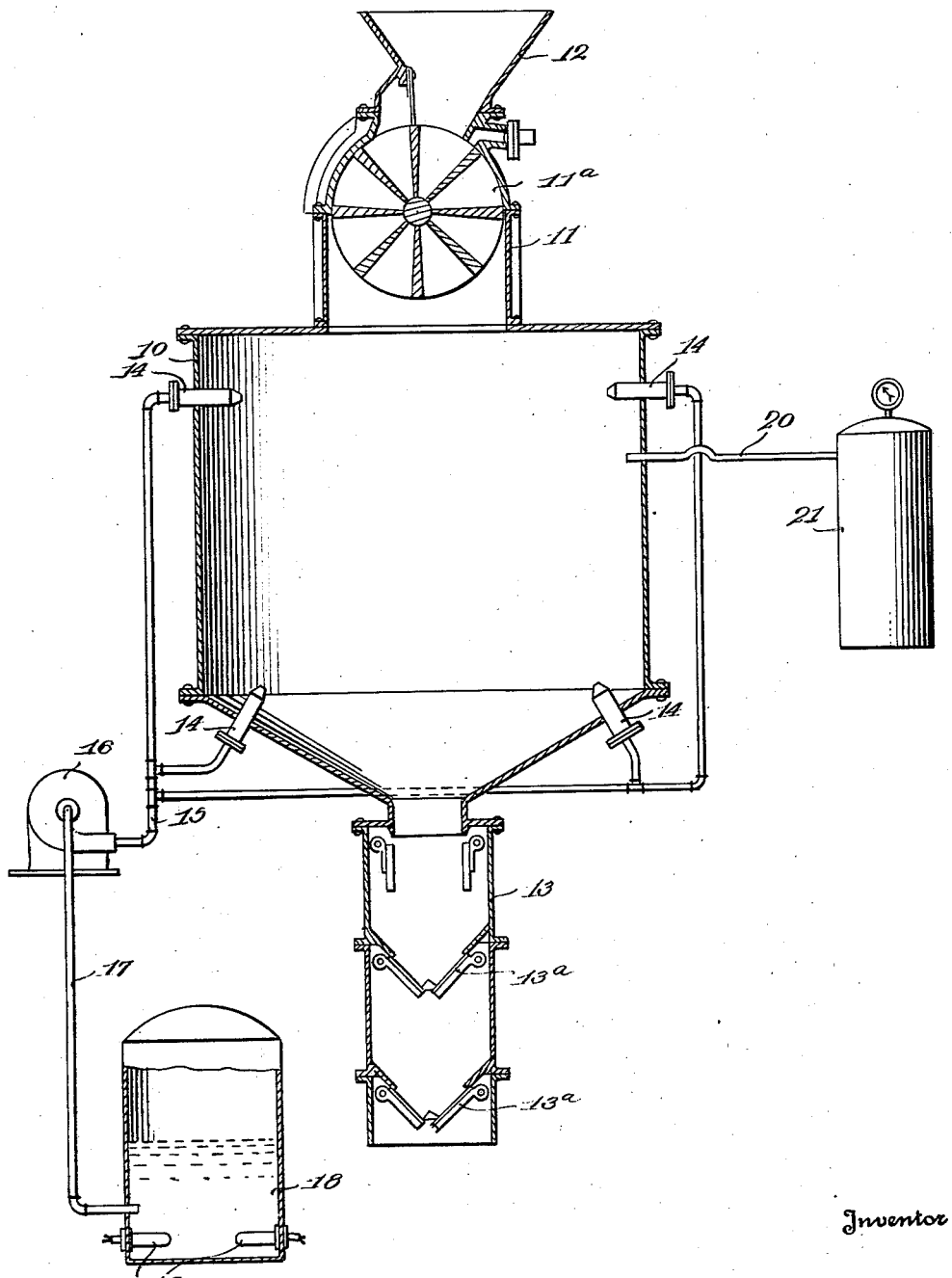

2,316,357

UNITED STATES PATENT OFFICE 2,316,357

METHOD OF PREPARING BITUMINOUS COATING MIXTURES

Ernest H. Nichols, Hagerstown, Md.

Application August 9, 1938, Serial No. 223,999

3 Claims. (Cl. 106—281)

This invention relates to the preparation of asphalt for use in the manufacture of roofing, as a protective coating for metal and other substances, and for other purposes.

It has been common practice in the preparation of such asphalt to treat the same with relatively expensive agents, such as oils, resins, wool grease, waxes, and fatty acids for the purpose of retarding oxidation, polymerization, condensation, and general deterioration. These agents, whether one or more are used, will therefore be hereinafter referred to as "the retarder." Because of the attendant expense there has been a tendency to economize in the use of retarders to such an extent as to impair the efficiency of the final product.

An object of the present invention is therefore to provide a method whereby to reduce the cost of retarders in the preparation of an asphalt batch of the type mentioned.

A further object is to provide a filler for asphalt mixtures of the type mentioned which will not absorb the lighter oils therefrom.

Another object is to provide a filler for asphalt, which shall possess such characteristics as to lessen materially the amount of time required for mixing.

Another object is to provide a filler for asphalt, through the use of which the viscosity of the resultant batch will be lowered so that it may be spread more readily than when using fillers such as have been employed in the past.

Another object is to eliminate bubbles and pin holes in asphalt mixtures of the type mentioned.

Another object is to eliminate blisters in asphalt coatings.

Another object is to eliminate the sliding of the asphalt mixture in hot weather.

A further object is to control more easily the final penetration of the asphalt mixture.

A further object is to provide a filler powder for asphalt which, when being handled, will not disperse in the form of dust.

It has been common practice when preparing asphalt for use in the manner stated at the outset to incorporate therewith a filler consisting of finely powdered mineral matter, the filler being used to produce a composition having a higher melting point and having other desirable qualities well-known to those skilled in the art.

In carrying out the present invention, I use the filler for extending the retarders throughout the asphalt, the filler serving as a carrier base. I prefer to use a filler comprising finely powdered slate, and I have discovered that by coating the filler particles with the retarder, which may consist of one of the agents mentioned or a number thereof mixed together, said filler particles have a much greater affinity for the asphalt than do the particles of a dry filler, so that they wet much more readily in the asphalt. For this reason, it is possible to mix with the asphalt a much greater proportion of filler when the particles thereof are coated with the retarder than has been possible with the use of dry fillers in the past. Therefore, by following my method, an asphalt batch of a given amount will contain less asphalt than heretofore, from which it follows that less retarder will be required, thus proportionately decreasing the cost of the retarder.

I have also discovered that as the filler particles have been thoroughly wetted with the retarder before being mixed with the asphalt they will not absorb the lighter oils therefrom, which absorption would increase the viscosity of the asphalt mixture.

Another advantage derived from wetting the filler particles as stated is that much less time is consumed in preparing a batch because of the readiness with which the filler mixes with the asphalt. Furthermore, such a filler, because its particles are wetted with the retarder, lowers the viscosity of the final mixture and permits it to be spread more readily.

Again, the thus wetted filler does not tend to convey air into the asphalt when being introduced thereinto as do dry fillers, because of which bubbles and pinholes in the asphalt are greatly lessened if not entirely eliminated. For the same reason the formation of blisters in a coating of asphalt thus prepared is eliminated.

A very important and desirable result of coating the filler particles with the retarder is that in the use of a filler thus coated the dispersion of the filler particles in the form of dust, while being handled, is eliminated. This dispersion results in loss of material and is otherwise objectionable in that the particles, having been carried by air currents, settle upon and damage the clothing of the operators, also damage nearby machinery by settling upon and entering the bearings thereof.

As has already been explained, when preparing an asphalt mixture according to the present invention it is possible to incorporate therein a greater proportion of the mineral filler than has been possible heretofore. Because of this excess filler the sliding of such an asphalt coating in hot weather has been practically eliminated. It has also been discovered that, as the filler particles have been pre-wet, they do not absorb the volatiles from the asphalt, thus enabling the final penetration of the asphalt mixture to be more easily controlled.

The retarder, which may consist of one of the agents mentioned or a number thereof mixed together, is applied to the filler particles by being sprayed thereon in a manner and with the mechanism now to be described.

Referring to the accompanying drawing, wherein there is shown a diagrammatic view of the mechanism used for spraying the filler particles with the retarder, 10 designates a closed chamber preferably formed of metal, leading into the top of which is an inlet chute 11 which supports a hopper 12, and leading from the bottom of the chamber 10 is an outlet chute 13. Positioned in the chutes 11 and 13 are valves indicated at 11a and 13a, respectively, the former of which permits only of ingress into the chamber 10 and the latter of which permits only of egress therefrom. These valves may be of any desired construction. Connected to the opposite sides of the chamber 10 so as to discharge thereinto are atomizing nozzles 14, of which any suitable number may be employed, these nozzles being fed by a pipe 15 which leads from a pumping unit 16. The pumping unit 16 is connected by a pipe 17 to a tank 18 containing the necessary retarder, which tank is provided with electric heating units 19 by means of which the retarder is maintained at such a fluidity as is necessary to permit it to be atomized. Leading through one side of the chamber 10 so as to discharge thereinto is one end of a pipe 20 having its other end connected to a tank of compressed air 21.

The operation of the mechanism just described is as follows:

The untreated filler is conveyed into the hopper 12 in any desired manner from which it passes through the chute 11 into the chamber 10 where it encounters a blast of air issuing into the chamber from the pipe 20, causing its particles to be widely dispersed throughout the chamber. The pumping unit 16 having been placed in operation will draw retarded from the tank 18 and will force the same through the pipe 15 to the spray nozzles 14 from which it will be atomized into the chamber 10 and upon the filler particles. The coated particles will then be carried through the chute 13 by the air escaping through said chute, after which they may be conveyed to storage in any suitable manner.

When making up an asphalt mix embodying a filler prepared according to the present invention I find that excellent results may be obtained by using the asphalt and filler in approximately the following proportions: 250 pounds of coated filler to 750 pounds of asphalt, which latter has been rendered thoroughly liquid by heating the same. I also find that when applying the retarder to the filler the following proportions should be observed: Approximately 10 pounds of retarder to each ton of filler.

When using mineral oil, soy bean oil, sperm oil, or other oils as a retarder, the same should be heated in the tank 18 to such a consistency as will permit them to be atomized through the atomizers 14. This is also true when using petrolatum, wool grease, mineral and vegetable waxes such as ozokerite and japan wax, when using stearic acid, or when using natural or synthetic resin. When using ozokerite the same may be mixed with an equal quantity of mineral oil of 33 A. P. I. Baumé gravity before heating, as this will reduce the degree of heat required to bring the material to the proper consistency for atomizing.

When it is desired to prepare an asphalt mix without the use of a retarder, but with the use of a filler, the latter may be prepared so as to mix with the asphalt more readily and so as not to disperse in the form of dust, by spraying its particles in the manner herein described with asphalt, pitch or tar, after reducing the same to the necessary consistency for spraying, by the application of heat or with the use of a suitable thinner.

It is to be understood that my method of treating fillers is not limited to use in connection with the particular retarders mentioned herein, but may be used in connection with any of the retarders commonly used in the preparation of asphalt. It is also to be understood that other proportions than herein stated may be employed when mixing the filler with the asphalt and when spraying the filler particles with the retarders. I have found, however, that the proportions given produce satisfactory results.

What is claimed is:

1. A method of preparing a bituminous coating mixture including asphalt, a finely powdered slate filler and an agent for retarding deterioration of the asphalt, comprising coating the slate particles with the retarding agent, heating the asphalt to render the same sufficiently fluid to mix thoroughly with the coated particles, and subsequently mixing the coated particles throughout the asphalt.

2. A method of distributing throughout a bituminous coating mixture comprising asphalt and a filler of finely powdered slate, an agent for retarding deterioration of the asphalt, consisting of heating the retarding agent, coating the slate particles with the heated retarding agent, heating the asphalt to render the same sufficiently fluid to mix thoroughly with the coated slate particles, and subsequently mixing said particles throughout the asphalt.

3. A bituminous mixture comprising asphalt and a filler of finely powdered slate, the particles of said powdered slate having a coating of an agent for retarding deterioration of the asphalt, said retarding agent being selected from the group consisting of oil, resin, wool grease, wax, and fatty acid.

ERNEST H. NICHOLS.